Feb. 25, 1969　　　D. H. WHISTON ETAL　　　3,429,222
DRIVE MEANS FOR CUPOLA OF TANK VEHICLE
Filed April 8, 1968　　　　　　　　　　　　Sheet 1 of 3
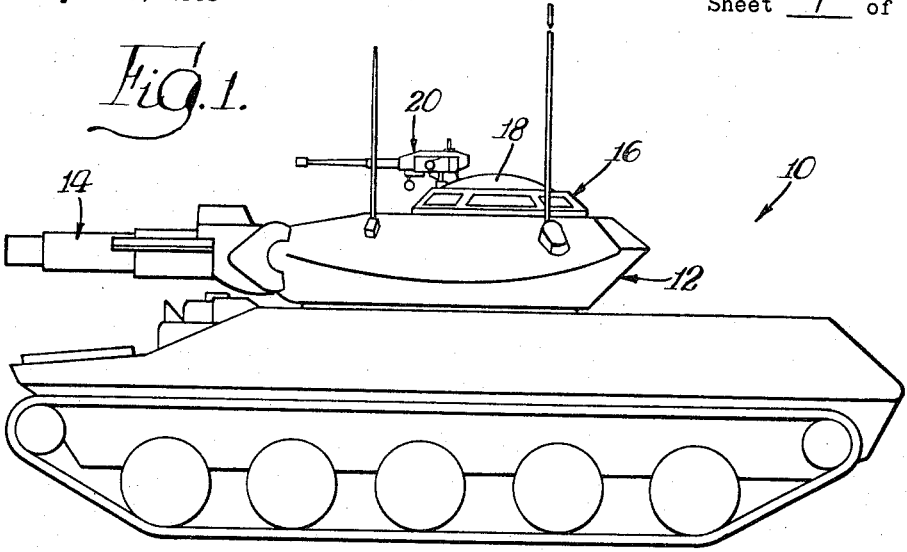
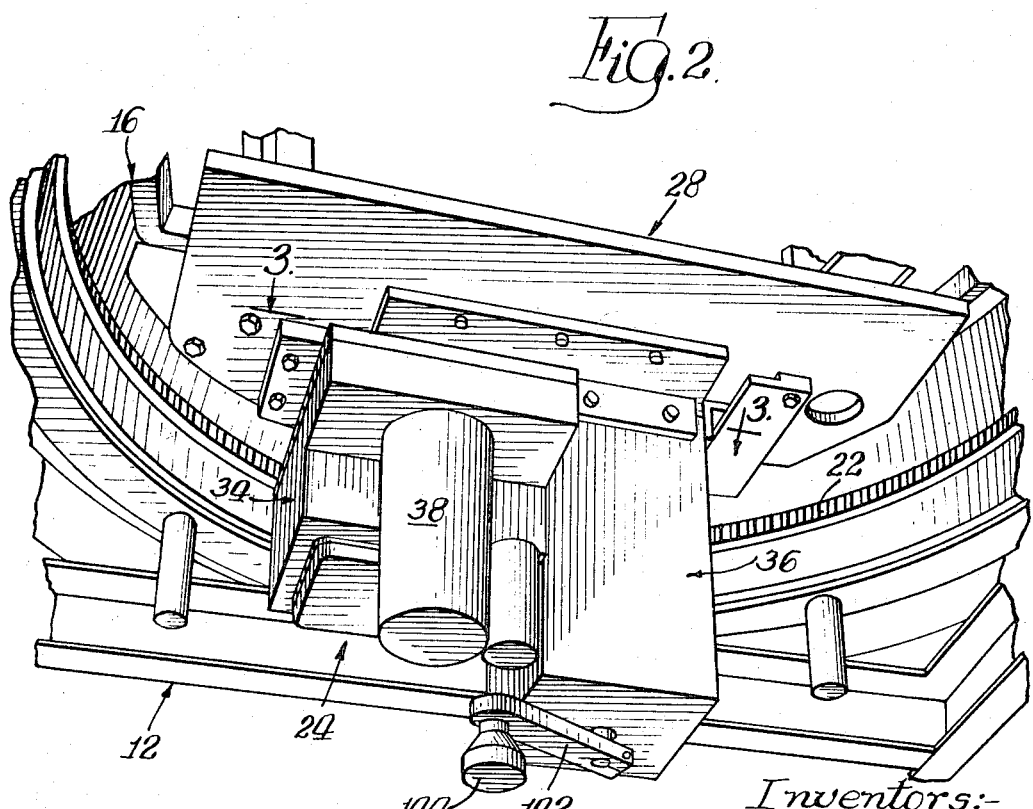
Inventors:-
Donald H. Whiston,
Edward J. Flannery
By Norman A. Witt
Atty

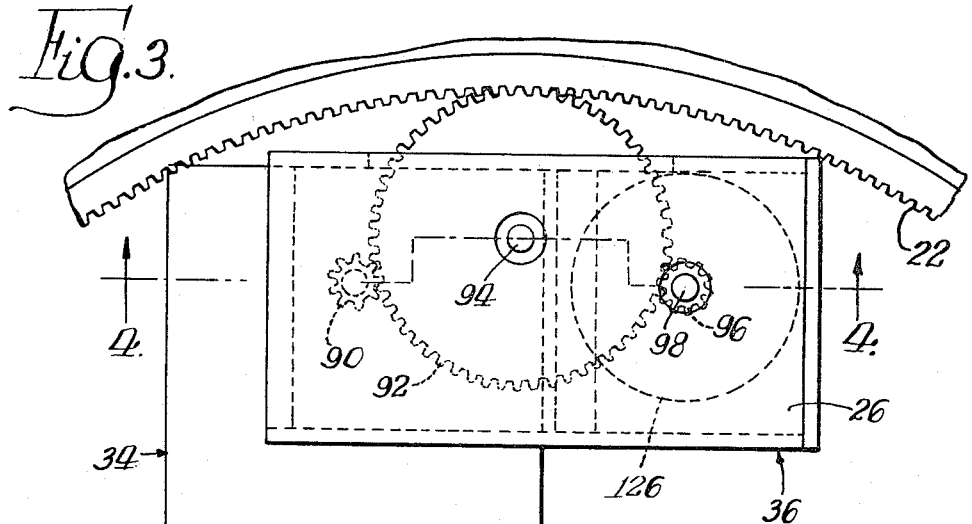
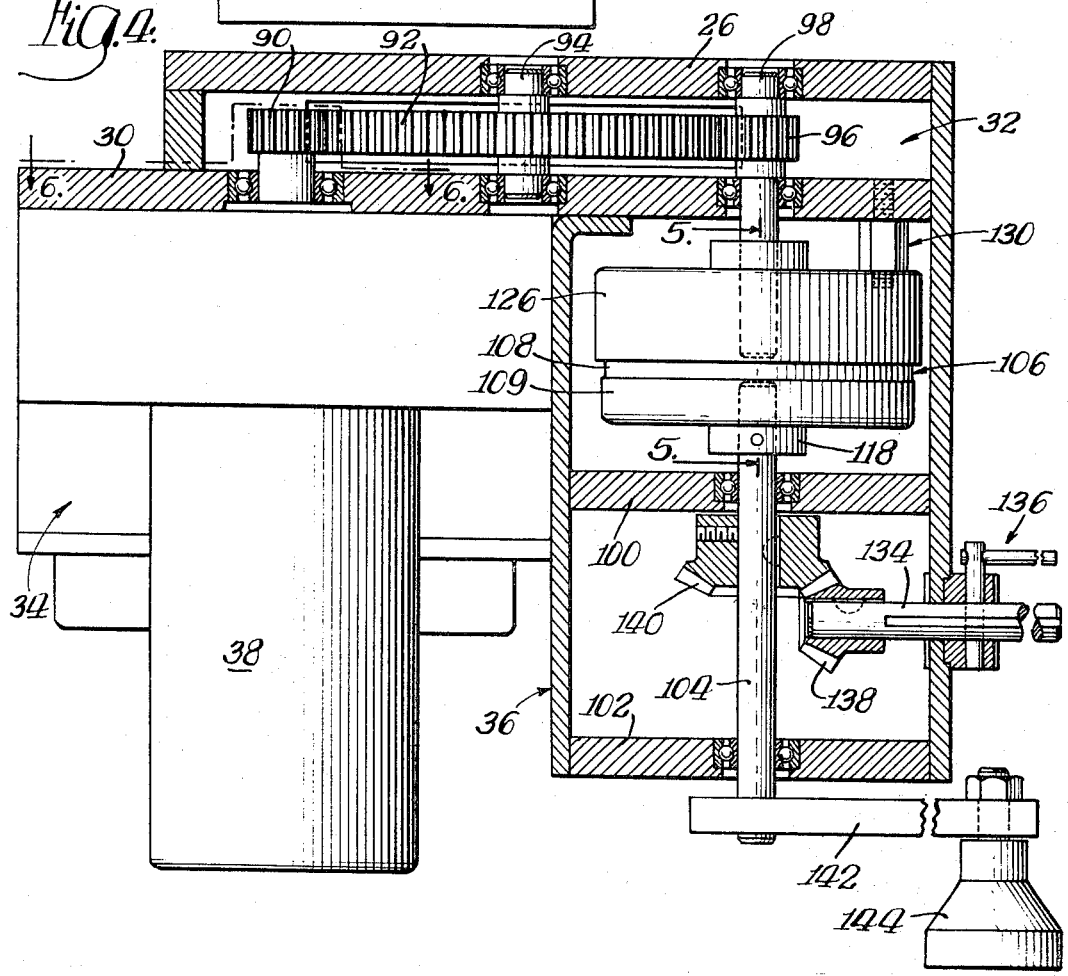

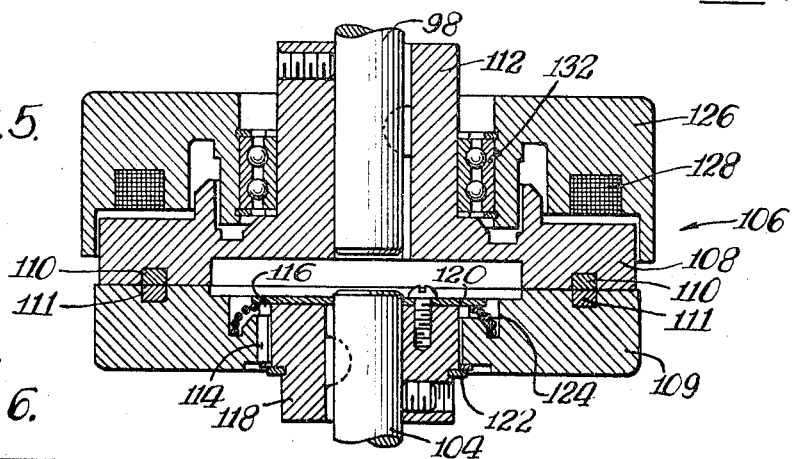
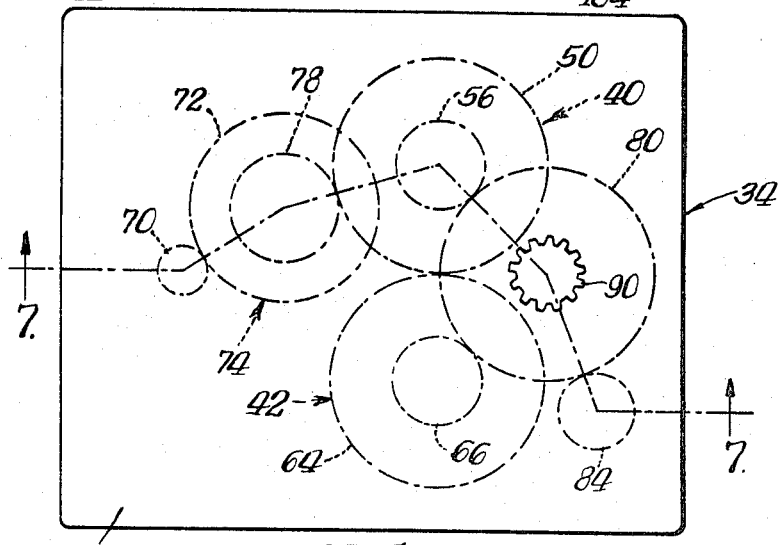
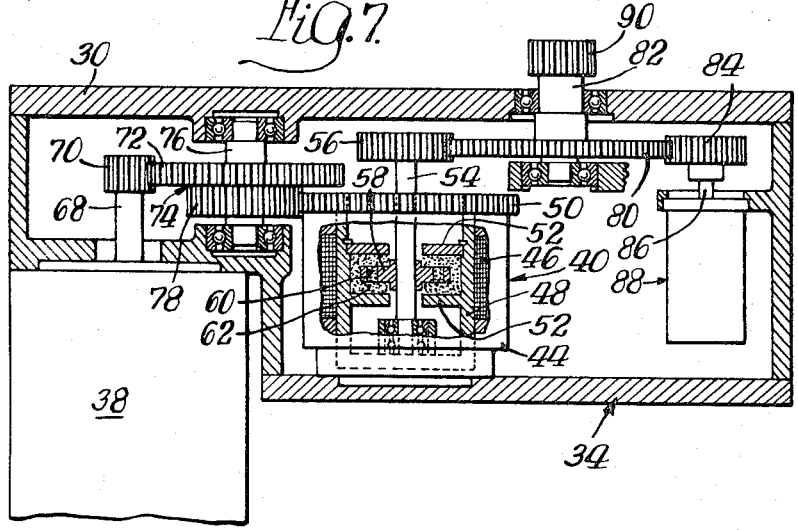

United States Patent Office 3,429,222
Patented Feb. 25, 1969

3,429,222
DRIVE MEANS FOR CUPOLA OF TANK VEHICLE
Donald H. Whiston, Arlington Heights, and Edward J. Flannery, Park Ridge, Ill., assignors to Vapor Corporation, Chicago, Ill., a corporation of Delaware
Filed Apr. 8, 1968, Ser. No. 719,405
U.S. Cl. 89—41            10 Claims
Int. Cl. F41h 7/08

ABSTRACT OF THE DISCLOSURE

Drive means for a rotatable cupola of a tank vehicle, comprising a constant speed electric motor, a power gear train arranged between the motor and the cupola, and a pair of magnetic particle clutches interposed in the gear train and adapted to be optionally electrically energized for establishing a torque coupling in the gear train whereby to effect rotation by the motor of the cupola in either direction.

Background of the invention

*Field of the invention.*—The present invention relates generally to a tank vehicle having a cupola rotatably mounted, for example, on a rotatable turret, and more particularly pertains to drive means for effecting rotation of the cupola in either direction.

*Description of the prior art.*—One general type of tank vehicle has a cupola and weapon mounted, for example, on a turret. The principal problem in this art has concerned the provision of a power system to enable the vehicle commander to automatically rotate or elevate the weapon quickly without the use of manual force. Heretofore, pneumatic systems, hydraulic systems, all electric systems, and combinations of each, have been proposed and found unsatisfactory.

The disadvantages of a pneumatic system include the extremely difficult problem of obtaining the required range of speed control due to friction in the air-operated actuators, poor efficiency, poor dynamic response, noise of escaping air, and possible danger to personnel inherent in the use of high pressure compresed air.

In the case of a hydraulic system, the required motor, pump, accumulator and related components are relatively bulky; high pressure lines must extend among the power unit, control valves and actuators; and return lines are also required. Because of drastic space limitations, as well as the necessity to provide 360 degrees relative rotation between the cupola, turret and tank chassis, the hydraulic lines present almost insurmountable problems of satisfactory physical location, and additionally are a potential danger to personnel.

One type of electrical system employs either A.C. (two phase) or D.C. servo motors as prime movers with appropriate gearing to reduce the speed of the output shaft. Such system requires relatively high power amplifiers to drive the motors and, in the case of two phase motors if only one phase is driven, is relatively inefficient. In any event, for an equivalent power output, the motors are appreciably larger than a hydraulic or pneumatic motor, and dynamic response is relatively poor because of the inherently high motor rotor inertia. Another electrical system involves the use of a synchronous motor driven by a variable frequency power source, consisting, for example, of a variable frequency pulse generator followed by appropriate solid state power amplifiers and filters. In this system, the power source is complex and is attendant with breakdown and poor reliability during service life. Also, because of the peak torques required of the motor, the motor must be of relatively large size. Still further, dynamic response once again is degraded by a large rotor inertia.

Summary of the invention

In accordance with the principles of the present invention, there are provided a constant speed electric motor having an output shaft, a pair of magnetic particle clutches each having a rotatable input element and a rotatable output element with the input elements being connected for rotation in opposite directions, first gear means establishing a constant driving connection between the motor output shaft and the input element of one of the clutches, and second gear means establishing a constant driving connection between each of the clutch output elements and the cupola to be rotated. The magnetic particle clutches are adapted to be optionally electrically energized for selectively establishing a torque coupling between the input and output elements of one of the clutches whereby to effect drive by the motor of the cupola in either direction. The drive means of the present invention is simple, reliable and compact; permits sensitive speed control over wide load torque variations; and has excellent dynamic response with negligible inertia effects.

Additionally, means are provided for braking the second gear means whereby to maintain the cupola in any preselected rotative position, and such brake means is arranged to be rendered ineffective when either of the magnetic particle clutches is energized. While the drive means of the present invention is shown and described specifically for use in controlled rotation of a cupola and weapon in a generally horizontal plane, it will be appreciated that corresponding drive means may also be adapted for elevating and depressing the cupola weapon.

Brief description of the drawings

FIGURE 1 is a side elevational view to a tank vehicle having a rotatable cupola with which the present invention may be incorporated;

FIGURE 2 is a fragmentary perspective view of the interior of the tank cupola of FIGURE 1, and shows the drive means of the present invention for effecting rotation thereof;

FIGURE 3 is a partial horizontal view of the cupola drive means of FIGURE 2, taken substantially along the line 3—3 in FIGURE 2, looking in the direction indicated by the arrows;

FIGURE 4 is a vertical sectional view, taken substantially along the line 4—4 in FIGURE 3, looking in the direction indicated by the arrows;

FIGURE 5 is a vertical sectional view, taken substantially along the line 5—5 in FIGURE 4, looking in the direction indicated by the arrows;

FIGURE 6 is a generally diagrammatical horizontal view, taken substantially along the line 6—6 in FIGURE 4, looking in the direction indicated by the arrows, and rotated 90 degrees; and FIGURE 7 is a vertical developed sectional view taken substantially along the line 7—7 in FIGURE 6, looking in the direction indicated by the arrows.

Description of the preferred embodiment

Referring now to FIGURE 1, there is indicated generally by the reference numeral 10 a crawler-type tank vehicle having a rotatable turret 12 with armament 14, and having a rotatable cupola 16 with a hatch 18 and a weapon in the form of a gun 20. The cupola 16 includes a horizonal internal ring gear 22 (FIGURE 2) which is adapted to be rotated by drive means 24 carried by the turret 12 interiorly of the cupola at the commander's station thereof.

The drive means 24, as shown in FIGURES 2, 4 and 7, includes housing means comprised of an upper horizontal support wall 26 that is secured to the underside of the platform 28 of the turret 12, a primary horizontal bearing wall 30 spaced below the support wall 26 and defining therewith a gear housing section 32, a casing assembly 34 depending from the bearing wall 30 and defining a clutch housing section, and a casing assembly 36 depending from the baring wall 30 and defining a brake housing section at the side of the clutch housing section 34. A constant speed 24-volt D.C. drive motor 38 is suitably secured to the underside of the clutch housing section 34.

Arranged within the clutch housing section 34, as shown in FIGURES 6 and 7, are a pair of magnetic particle clutch units 40 and 42. The clutch unit 40 is comprised of a stationary housing 44 in which is mounted an annular stationary coil 46, a rotatable cage or input element 48 having an upper drive gear 50 and axially spaced annular partitions 52, and a central rotatable shaft or output element 54 having an upper output gear 56 and a disc 58 mounted intermediate of the cage partitions 52. The disc 58 is provided with axial ports 60, and the area thereabout is filled with iron filings or particles 62. The clutch unit 42, which includes a drive gear 64 and an output gear 66, is identical in construction and operation to the clutch unit 40. Therefore, it is believed that a detailed showing and description of the clutch unit 42 is unnecessary.

Mounted on the output shaft 68 of the drive motor 38 is a pinion 70 which has meshing engagement with the large gear portion 72 of a compound gear 74 secured on a spindle 76 rotatably mounted in the bearing wall 30 and casing assembly 34. The small gear portion 78 of the compound gear 74 has meshing engagement with the drive gear 50 of the clutch unit 40 which in turn has meshing engagement with the drive gear 64 of the clutch unit 42. The output gears 56 and 66 each have meshing engagement with a common intermediate gear 80 secured on a rotatably mounted spindle 82 that projects upwardly through the bearing wall 30. The gear 80 also meshes with a pinion 84 secured on the shaft 86 of a tachometer 88 mounted within the clutch housing section 34. Secured on the upper end of the spindle 82 is an intermediate pinion 90 which, within the gear housing section 32 as shown in FIGURES 3 and 4, has meshing engagement with a main drive gear 92 secured on a spindle 94 rotatably mounted in the support and bearing walls 26 and 30. The gear 92 extends outwardly of the gear housing section 32 at one side thereof and has meshing engagement with the internal ring gear 22 of the rotatable cupola 16.

The main drive gear 92 also has meshing engagement with an auxiliary pinion 96 secured on a vertical shaft 98 which is rotatably mounted in the support and bearing walls 26 and 30 and which projects downwardly into the brake housing section 36. The brake housing section 36 includes an intermediate horizontal wall 100 and a lower horizontal wall 102 in which is rotatably mounted a vertical shaft 104 extending coaxially of the shaft 98. Arranged between the adjacent ends of the shafts 98 and 104, as shown in FIGURES 4 and 5, is a magnetic clutch unit 106 which is operable to couple the shafts 98 and 104 together. The clutch unit 106 is comprised of two clutch plates 108 and 109 in which are respectively embedded a plurality of permanent magnets 110 and 111. The clutch plate 108 has a hub portion 112 secured to the shaft 98, while the clutch plate 109 is provided with internal axial splines 114 slidable on external axial splines 116 of a hub member 118 secured to the shaft 104. A retaining washer 120 and a snap ring 122 are affixed to the hub member 118, and a coil spring 124 is interposed between the retaining washer 120 and the clutch plate 109. A stationary ring 126, which has an annular coil 128 secured by fastening means 130 to the bearing wall 30, and a ball bearing assembly 132 is mounted intermediate of the clutch hub 112 and the ring 126. The ring 126 and coil 128 define electro-magnetic release means for the clutch unit 106.

Axially slidable in the side wall of the brake housing 36 is a horizontal non-rotatable spindle 134 which is provided at its outer end with a hand grip 136 and at its inner end with a bevel gear 138 adapted to be selectively engaged with a bevel gear 140 secured to the shaft 104.

The lower end of the shaft 104 has secured thereto a radial arm 142 having a hand grip 144 at its outer end.

In the inactive condition of the drive means described above, the magnetic particle clutch units 40 and 42 and the magnetic clutch unit 106 are deenergized. Thus, the input elements of the clutch units 40 and 42 are free to rotate relative to the output elements hereof, and no torque is transmitted from the motor 38 to the cupola ring gear 22. At the same time, the magnets 110 and 111 cause the clutch plates 108 and 109 of the unit 106 to be drawn together in clutching engagement whereby the shafts 98 and 104 are coupled together, and the engaged bevel gears 138 and 140 serve to hold the shaft 104 against rotation. In this manner, the cupola 16 is braked against rotation and maintained in any preselected rotative position.

When the rotation of the cupola 16 is desired, the coil of one of the magnetic particle clutch units 40 or 42 is electrically energized thereby creating a magnetic field. The magnetic flux magnetizes the iron particles 62 within the gap between the partitions 52 and the disc 58, causes the particles 62 to form a rigid mass capable of transmitting torque, and establishes a coupling bond between the input and output elements of the clutch unit. At the same time, the coil 128 of the magnetic clutch unit 106 is energized. The magnetic field thereby created serves to counteract the attractive force of the magnets 110 and 111 thus permitting the spring 124 to slide the clutch plate 109 away from the clutch plate 108 for disengaging the same. In this manner, the shafts 98 and 104 are uncoupled, and rotation of the cupola 16 in an arcuate path is effected by the drive motor 38 and the intervening torque-transmitting clutch and gear means.

The effective torque coupling established in the energized particle clutch unit is proportional to the strength of the magnetic field which in turn is proportional to the exciting current introduced into the stationary clutch coil. In this connection, the coils of the clutch units 40 and 42 are preferably connected in push-pull relationship in the electrical circuit therefor, and a suitable summing amplifier and a manually-operated current controller are incorporated in this circuit. With this arrangement, torque transmission may be readily varied substantially as a linear function of coil excitation. Either clutch unit 40 or 42 may be energized whereby the cupola 16 may be rotated in either direction. The output torque of the energized clutch unit is independent of speed, and hence there is a smooth flow of power to the cupola 16. However, accurate speed control of cupola rotation is also required. Because the torque load of the cupola, as the result for example of preloaded bearing supports, is independent of speed, the tachometer 88 is included for sensing the output speed of the drive gearing. The tachometer output signal is used to close a control loop in the circuit of the clutch units 40 and 42, and thus true speed of rate control is provided. Moreover, because the low inertia of the motor and clutches does not affect system dynamics, excellent control stability is attained, and accurate starting and stopping of the cupola is possible.

After the cupola 16 has been rotated to the desired position, the clutch units 40, 42 and 106 are deenergized. Again torque transmission through the clutch units 40 and 42 is interrupted, and the clutch plates 108 and 109 are reengaged for braking rotation of the cupola. Also, should there be a power failure in the electrical control circuit, the clutch plates 108 and 109 would be immediately reengaged for braking the cupola as part of a fail-safe function. Additionally, the bevel gear 138 may be disengaged from the bevel gear 140 by sliding the brake spindle 134 outwardly, and the shaft 104 may then be rotated manually through the arm 142 for effecting emergency rotation of the cupola.

In the described drive means, the motor, clutches and gearing are completely self-contained with the compact housing means being designed to allow installation in such a manner that the tank commander's vision is not appreciably restricted. It is only necessary to provide electrical power to the system. No auxiliary equipment, such as motor generator sets, compressors or accumulators, is required. And, since low voltage electrical power is utilized, there is no safety hazard such as is present with pneumatic or hydraulic systems. Finally, by substituting for example a worm gear for the ring gear 22, the drive means of the present invention may be adapted for elevating and depressing the cupola weapon 20 in an arcuate path.

While there has been shown and described a preferred embodiment of the present invention, it will be understood by those skilled in the art that various rearrangement and modifications may be made therein without departing from the spirit and scope of the invention.

We claim:

1. In a tank vehicle, a member mounted for movement in an arcuate path, a constant speed electric motor having an output shaft, at least a first magnetic particle clutch having a coil and a rotatable input element and a rotatable output element, first gear means establishing a constant driving connection between said motor output shaft and said clutch input element, second gear means establishing a constant driving connection between said clutch output element and said vehicle member, and said clutch coil being adapted to be electrically energized for selectively establishing a torque coupling between said clutch input and output elements whereby to effect drive by said motor of said vehicle member in said arcuate path.

2. The tank vehicle of claim 1 including a second magnetic particle clutch having a coil and a rotatable input element and a rotatable output element, said second clutch input element having a constant driving connection with said first clutch input element for rotation in the opposite direction thereof, said second clutch output element having a constant driving connection with said second gear means, and said first and second clutch coils being optionally electrically energized for selectively establishing a torque coupling between said first clutch input and output elements or said second clutch input and output elements whereby to effect drive by said motor of said vehicle member in either direction in said arcuate path.

3. The tank vehicle of claim 1 wherein said first gear means is comprised of a gear secured to said first clutch input element; and including a second magnetic particle clutch having a coil and a rotatable input element and a rotatable output element, said second clutch input element having secured thereto a gear in constant meshing engagement with said gear secured to said first clutch input element, said second clutch output element having a constant driving connection with said second gear means, and said first and second clutch coils being optionally electrically energized for selectively establishing a torque coupling between said first clutch input and output elements or said second clutch input and output elements whereby to effect drive by said motor of said vehicle member in either direction in said arcuate path.

4. The tank vehicle of claim 1 wherein said first gear means is comprised of a gear secured to said first clutch input element, and said second gear means is comprised of a gear secured to said first clutch output element; and including a second magnetic particle clutch having a coil and a rotatable input element and a rotatable output element, said second clutch input element having secured thereon a gear in constant meshing engagement with said gear secured to said first clutch input element, said second clutch output element having secured thereon a gear in constant meshing engagement with said second gear means, and said first and second clutch coils being optionally electrically energized for selectively establishing a torque coupling between said first clutch input and output elements or said second clutch input and output elements whereby to effect drive by said motor of said vehicle member in either direction in said arcuate path.

5. The tank vehicle of claim 4 wherein said second gear means is comprised of a spindle, an intermediate gear secured to said spindle and having constant meshing engagement with said gears secured to said first and second clutch output elements, an intermediate pinion secured to said spindle, a ring gear secured to said vehicle member, and a main drive gear in constant meshing engagement with said ring gear and said intermediate pinion.

6. The tank vehicle of claim 4 including an auxiliary pinion having constant meshing engagement with said second gear means, and means for braking said auxiliary pinion whereby to maintain said vehicle member in any preselected position in said arcuate path.

7. The tank vehicle of claim 5 including an auxiliary pinion having constant meshing engagement with said main drive gear, and means for braking said auxiliary pinion whereby to maintain said vehicle member in any preselected position in said arcuate path.

8. The tank vehicle of claim 5 including a first shaft, an auxiliary pinion secured on said first shaft and having constant meshing engagement with said main drive gear, a second shaft, means for selectively holding said second shaft against rotation, magnetic clutch means for coupling said first and second shafts together whereby to maintain said vehicle member in any preselected position in said arcuate path, and electro-magnetic means for releasing said magnetic clutch means when said first or second magnetic particle clutches are energized.

9. The tank vehicle of claim 8 including housing means defining an upper gear housing section enclosing said main drive gear and said intermediate pinion and said auxiliary pinion, a depending clutch housing section enclosing said first and second magnetic particle clutches, a depending brake housing section enclosing said magnetic clutch means and said electro-magnetic release means, and said motor depending from said clutch housing section.

10. The tank vehicle of claim 9 including a rotatable turret; and wherein said vehicle member comprises a cupola rotatably mounted on said turret, and said housing means is stationarily mounted on said turret.

References Cited

UNITED STATES PATENTS 1,185,326   5/1916   Humphreys _____ 89—41

BENJAMIN A. BORCHELT, *Primary Examiner.*

STEPHEN C. BENTLEY, *Assistant Examiner.*